United States Patent
De Vaan et al.

(10) Patent No.: US 6,773,116 B2
(45) Date of Patent: Aug. 10, 2004

(54) PROJECTION DISPLAY DEVICE (75) Inventors: Adrianus Johannes Stephanes Maria De Vaan, Eindhoven (NL); Stephen Charles McClain, Eindhoven (NL); Holger Moench, Vaals (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/153,258

(22) Filed: May 22, 2002

(65) Prior Publication Data

US 2002/0180937 A1 Dec. 5, 2002

(30) Foreign Application Priority Data

May 22, 2001 (EP) .............................................. 01201929

(51) Int. Cl.[7] .............................................. G03B 27/28
(52) U.S. Cl. .............................. 353/98; 353/97; 353/33
(58) Field of Search ............................... 353/20, 30–34, 353/37, 81, 85, 97, 98, 99, 122; 349/5, 7, 8, 9

(56) References Cited

U.S. PATENT DOCUMENTS

| | | | | |
|---|---|---|---|---|
| 5,765,934 A | * | 6/1998 | Okamori et al. ............... | 353/94 |
| 6,343,862 B1 | * | 2/2002 | Sawai et al. .................... | 353/1 |
| 6,375,327 B2 | * | 4/2002 | Holman et al. ................ | 353/20 |
| 6,450,649 B2 | * | 9/2002 | De Vaan ....................... | 353/84 |
| 6,478,431 B1 | * | 11/2002 | Sawamura et al. ............ | 353/81 |
| 6,591,022 B2 | * | 7/2003 | Dewald ....................... | 382/274 |
| 2001/0008470 A1 | * | 7/2001 | Dewald ....................... | 359/850 |
| 2002/0176055 A1 | * | 11/2002 | De Vaan et al. ............... | 353/31 |

FOREIGN PATENT DOCUMENTS

EP          1098536 A2    9/2001    ............ H04N/9/31

* cited by examiner

Primary Examiner—Russell Adams
Assistant Examiner—Andrew Sever (57) ABSTRACT

The invention relates to a projection display device comprising an illumination system having a light source and an optical guiding means for providing an illumination beam, and an image display system for modulating the illumination beam with image information and projecting the image on a screen, and means for selectively transmitting a portion of the illumination beam having a desired characteristic to the image display system, and means for feeding back an unused portion of the illumination beam to the illumination system for re-illumination of the image display system. In order to improve the efficiency of the projection display device, a reflection means is provided at a portion of an entrance surface of the light-guiding means and the unused portion of the illumination beam is fed back into the light-guiding means.

19 Claims, 5 Drawing Sheets

PROJECTION DISPLAY DEVICE

The invention relates to a projection display device comprising an illumination system having a light source and an optical guiding means having an entrance surface for entering light from the light source and an exit surface for providing an illumination beam, an image display system having a display panel for modulating the illumination beam with image information and projecting the image on a screen, and means for selectively transmitting a portion of the illumination beam having a desired characteristic to the image display system and means for feeding back a portion of the illumination beam having an undesired characteristic to the illumination system for re-illumination of the image display system.

Projection display devices can be used in both rear and front image projection systems. In a rear projection system, the projection display device projects an image representing television or datagraphic information on the rear side of a diffusing transparent screen, which front side is directed to a viewing audience. In a front projection system, the projection display device projects an image representing television or datagraphic information on the front side of a reflecting screen, which front side is directed to a viewing audience.

Such a projection display device is known from the published international patent application WO98/23990. The known projection system comprises a light source and an integrating system for producing an illumination beam and an image display system having an image display panel for modulating the illumination beam with image information and projection of the modulated light beam on a screen. The integrator system has an exit surface which is located in an exit plane and a reflector present in the exit plane. Furthermore, the display device comprises a selective mirror and an optical system for partly imaging the exit aperture of the integrator system via the second selective mirror on the first reflector. In this arrangement, a portion of the illumination beam, which is not used for image formation, is fed back to the illumination system, so that at least a part of the reflected portion can be reused. The known system has the drawback that the optical system can be costly and must be adjusted during manufacture.

It is an object of the invention to provide a projection display device which is easy to manufacture and has a reduced number of optical components in the illumination system. This object is achieved by the projection display device according to the invention, and is characterized in that a reflection means is provided at a portion of the entrance surface of the light-guiding means and the unused portion of the illumination beam is fed back into the light-guiding means. In the device as claimed, the unused portion of the illumination beam may be, for example, the portion of the illumination beam which has not the desired polarization or desired color or the portion of the illumination beam which is not modulated by the display panel because it reflects from the partially reflective grid between the picture elements of the display panel or, if the illumination beam overfills the display panel, the portion of the illumination beam which is not modulated by the display panel because it falls outside the display panel. The recuperated light is then reflected by the reflecting means at the entrance surface of the light-guiding means, redistributed by the light-guiding means and mixed with the light from the light source.

In a particularly advantageous embodiment of the invention, the light-guiding means comprises a rod of optically transparent material. This optically transparent rod provides a homogeneous distribution across a cross-section of the illumination beam perpendicular to the propagation direction of the illumination beam.

In a further embodiment of the projection display device according to the invention, the unused portion of the illumination beam is fed back into the light-guiding means via its exit surface. This arrangement allows a compact design of the illumination system.

A further embodiment of the projection display device according to the invention is characterized in that the reflection means is a reflecting layer provided at the portion of the entrance surface of the light-guiding means. The size of the portion in the entrance surface determines the optical efficiency because the light can leave the optical system only via this portion or via the active areas of the display panel. If the illumination beam of the lamp is not homogeneous, the light distribution can be improved by dividing the reflecting layer of the entrance surface into a first portion and a second portion arranged around the first portion and separated from the first portion by an uncovered portion of the entrance surface.

In a further embodiment of the projection display device according to the invention, the means for selectively transmitting a desired portion of the illumination beam comprises a reflective polarizer or a dichroic filter. In a further embodiment of the projection display device according to the invention, the color filters are patterned on a wheel and each of the red, green or blue filters occupies a spiral-shaped portion of the wheel. The wheel is rotatably mounted and provided in operation with an illumination beam having a red, a green and a blue line-shaped portion for simultaneously scanning the display device.

A further embodiment of the projection display device according to the invention is characterized in that the projection display device is provided with a transmissive image display panel or a reflective image display panel. The transmissive image display panel may be a transmissive liquid crystal display. The reflective display panel may be a digital micromirrored display (DMD) panel or a reflective liquid crystal on silicon (LCOS) display panel.

In another embodiment of the projection display device according to the invention, a further light-guiding means is provided between the exit aperture of the light-guiding means and the image display panel for guiding the illumination beam to the image display panel. The means for selectively transmitting a desired portion of the illumination beam and reflecting an undesired portion of the illumination beam can be positioned between the exit aperture and the further light-guiding means or between the further light-guiding means and the image display panel. The further light-guiding means may comprise a prism of an optically transparent material or a system of lenses and mirrors.

Another embodiment of the projection display device according to the invention is characterized in that the projection display device comprises processing means for correcting colors of the projected image in dependence upon the color content of the image information. The color correction corrects for a higher intensity of a color in the illumination beam due to the recycling process.

These and other aspects of the invention are apparent from and will be elucidated with reference to the embodiments described hereinafter.

Figure 1:
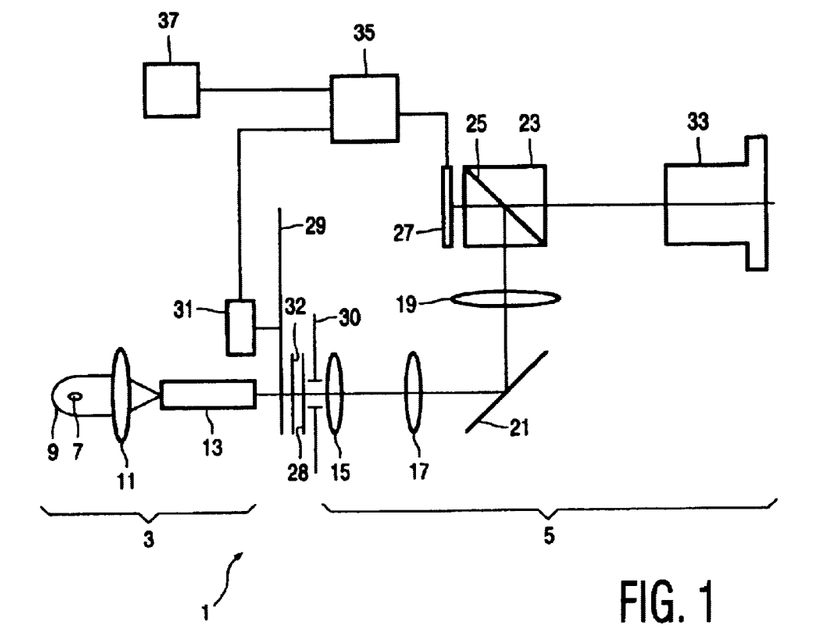
FIG. 1 shows an example of a first projection display device having a reflective display panel and a light-recycling system.

FIG. 1 shows an example of a first image projection system 1 comprising an illumination system 3 for supplying an illumination beam and an image display system 5 for modulating the illumination beam. The illumination system 3 comprises a light source 7, a reflector 9, a condenser lens 11 and a light-guiding means 13, for example, a rod of optically transparent material. The reflector 9 ensures that the greater part of the light emitted by the light source 7 in a direction away from the illumination system as yet reaches the image display system 5. The reflector 9 preferably has an ellipsoidal shape. The illumination beam generated by the illumination system 3 is incident on the image display system 5. The image display system 5 comprises a reflective display panel 27, a polarizing beam-splitting (PBS) prism 23, relay lenses 15,17,19, a mirror 21 and a projection lens 33. Furthermore, the first projection display device 1 comprises control means 35 and a color filter wheel 29 coupled to an electric motor drive 31. The control means is electrically coupled to a video source 37, for example a television receiver or a personal computer. The control means 35 synchronizes the rotation of the color filter wheel 29 with the video information in a known way. The color filter wheel 29 is positioned between the exit aperture of the optically transparent rod 13 and the image display system 5. A rectangular window 30 is positioned between the color filter wheel 29 and the image display system 5. A detailed description of the color filter wheel is given with reference to FIG. 4.

Furthermore, the first projection display device 1 comprises a reflective polarizer, for example, a wired grid polarizer 28 as can be ordered from Moxtec. The reflective display panel 27 is, for example, a reflective liquid crystal on silicon (LCOS) display panel.

In operation, light from the light source 7 and the reflector 9 is coupled into the optically transparent rod 13 via the elliptical reflector 9 and the input aperture at the entrance surface and coupled out of the optically transparent rod via an exit aperture at the exit surface. A front view of the entrance surface of the optically transparent rod is shown in FIG. 2.

Figure 2:
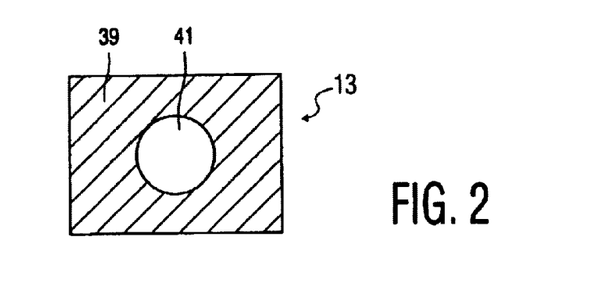
FIG. 2 shows the entrance surface of the transparent rod.

FIG. 2 shows an entrance surface of the optically transparent rod 13. The entrance surface is covered with a reflective layer 39 except for an annular aperture 41 around the longitudinal axis of the optically transparent rod 13. The exit surface is also provided with a reflective layer except for an uncovered portion forming the exit aperture. A front view of an alternative entrance surface of the optically transparent rod 13 is given in FIG. 3. Instead of one central aperture 41 in the reflective layer 39 at the entrance surface, the reflective layer is divided into two portions 43,45 in FIG. 3; a first annular portion 43 centered around a center of the entrance surface coaxial with the longitudinal axis of the optically transparent rod 13 and a second portion 45 around the first annular portion 43 covering the remainder of the entrance surface. The second portion 45 of the reflective layer is separated from the first portion 43 by an uncovered portion 47 forming a ring-shaped aperture in the entrance surface for coupling in the light from the light source 7 and the reflector 9 into the optically transparent rod 13.

Figure 3:
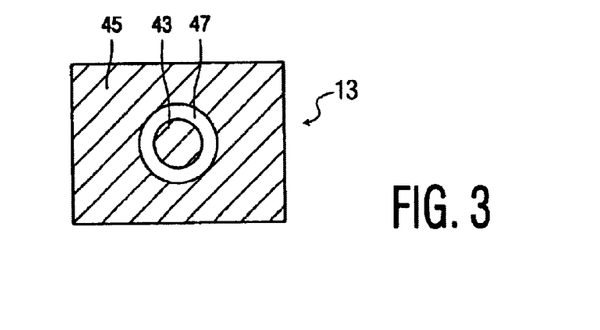
FIG. 3 shows the entrance surface with a reflection layer having a central portion and a peripheral portion.

For both types of entrance surface of the optically transparent rod 13, a ratio between the area of the aperture in the reflective layer and the area of the reflective layer is preferably larger than 5:1. This ratio depends, for example, on the arc length of an incandescent light source and can be found experimentally by a skilled person by optimizing the light output of the projection device 1.

The optically transparent rod 13 forms an illumination beam at the exit surface. The illumination beam is incident on a dichroic filter portion of the color filter wheel 29. The color filter wheel 29 preferably consists of three spiral-shaped filter portions for simultaneously transmitting red, green and blue light and reflecting cyan, magenta and yellow. The dichroic filter portions of the color filter wheel 29 reflect the undesired portion of the illumination beam, not having the proper color, back to the exit aperture at the exit surface of the optically transparent rod 13. Inside the optically transparent rod 13, a large portion of this reflected light is reflected by reflective layer 43,45 and can be used again. In the first projection display device 1, the unused portion of the illumination beam not having the desired characteristics is thus recycled and can be used again for illumination of the display panel 27.

The dichroic filter portion of the color filter wheel 29 transmits the portion of the illumination beam having the desired color to the reflective polarizer 28. The reflective polarizer 28 transmits only a portion of the illumination beam having a polarization directed in a first direction to the PBS prism 23 and reflects a portion of the illumination beam having a polarization directed in a second direction perpendicular to the first direction via the color filter wheel 29 back towards the optically transparent rod 13. By multiple reflections inside the optically transparent rod 13, a portion of the illumination beam is reflected by the reflective layer 29 at the entrance surface and can be used again for illumination of the LCOS panel 27. In this arrangement, a portion of the illumination beam not having the desired characteristic is recycled and can then be used again for illumination of the LCOS display 27. In order to improve the recycle efficiency, a quarter-wave plate 32 can be placed between the color filter wheel 29 and the reflective polarizer 28 to rotate the polarization of the reflected portion of the illumination beam to the first polarization direction. The relay lenses 15,17,19 guide the desired portion of the illumination beam towards the entrance surface of the PBS prism 23. The beam-splitting layer 25 of the PBS prism 23 reflects the portion of the illumination beam having the polarization in the first direction towards the LCOS panel 27. The LCOS panel 27 reflects the illumination back to the PBS prism 23 and rotates the polarization direction of the illumination beam in conformity with the image information related to the instant color of the illumination beam. The polarizing beam-splitting layer 25 transmits a first portion of the reflected modulated illumination beam towards the projection lens 33 and reflects a second portion of the reflected illumination beam back to the optically transparent rod 13. The light modulated by the image panel 27 is projected on a screen (not shown) by means of a projection lens system represented for the sake of simplicity by a single projection lens 33.

Figure 4:
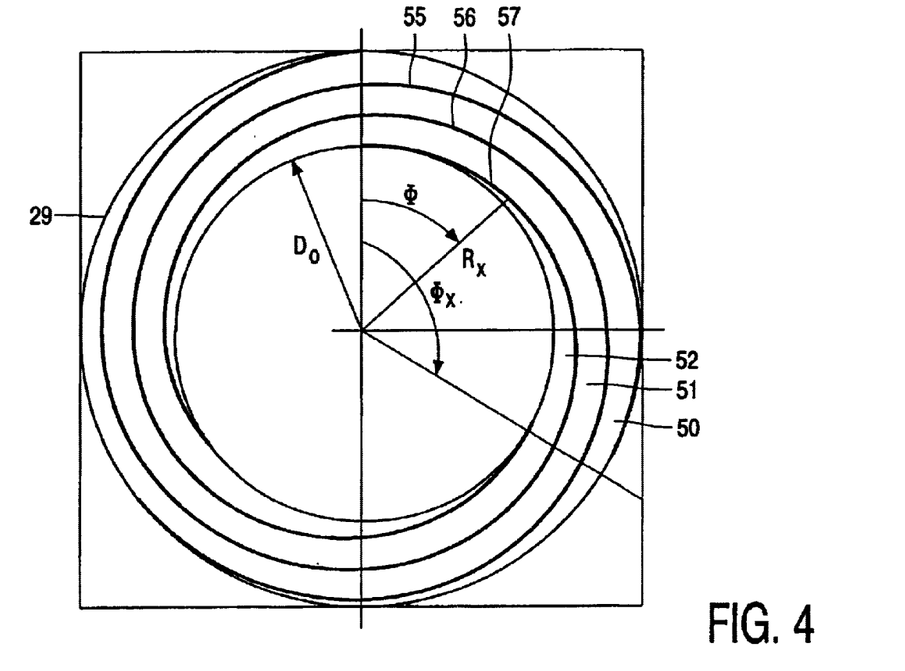
FIG. 4 shows a first example of a color filter wheel pattern.

In the color filter wheel, each color filter occupies a spiral-shaped portion of the circular filter wheel. The intersection between different color filters can be described by the formula $$Rx = D0 + \alpha(\phi + \phi X) \quad (1)$$

wherein

Rx represents a distance between the intersection between two color filters and the hub of the color filter wheel, D0 represents a distance between a side of the illumination window nearest to the hub and the hub of the color filter wheel, α represents a predetermined constant angle, φ represents the rotating angle of the color filter wheel, and φX represents the phase of the intersection.

FIG. 4 shows a first example of a color filter wheel 29 having dichroic color filters 50,51,52 for transmitting red, green and blue light. The three spiral-shaped portions of the color filter wheel are identical for each color. The intersections 55,56,57 of the filter portions 50,51,52 can be found by applying formula (1) and setting the phase for each intersection at 0°, 120° and 240°.

Figure 5:
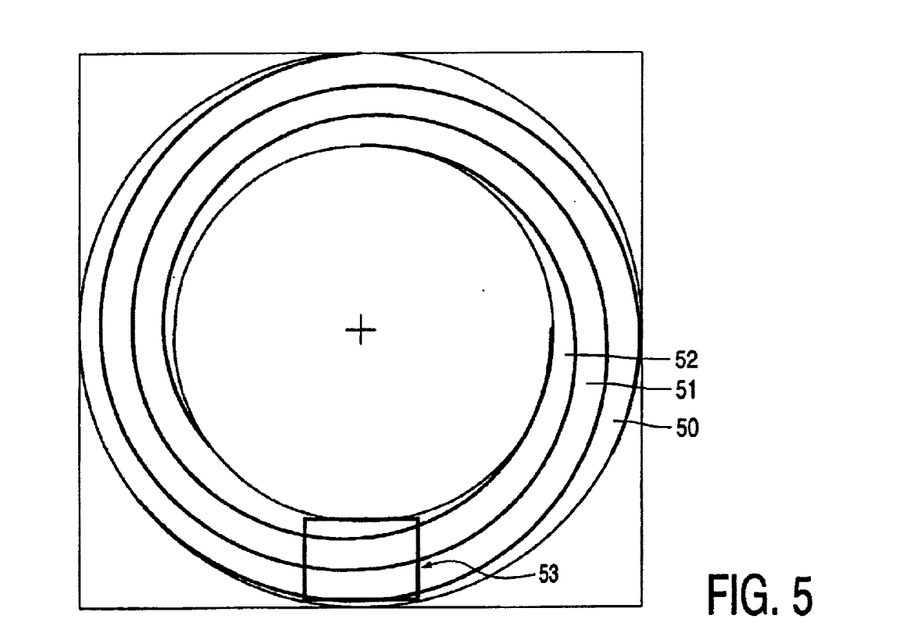
FIG. 5 shows an example of a color filter wheel pattern and an illumination window.

FIG. 5 shows a color filter wheel 29 in combination with a rectangular illumination window 53. In operation, the arrangement of the rotating spiral-shaped dichroic color filter and the rectangular illumination window 30 provides an illumination beam having red, green and blue portions with a rectangular cross-section in the propagation direction of the illumination beam, simultaneously scanning one or more lines of the display panel 27 so that all the lines are consecutively illuminated by the red, green and blue portions of the illumination beam.

Figure 6:
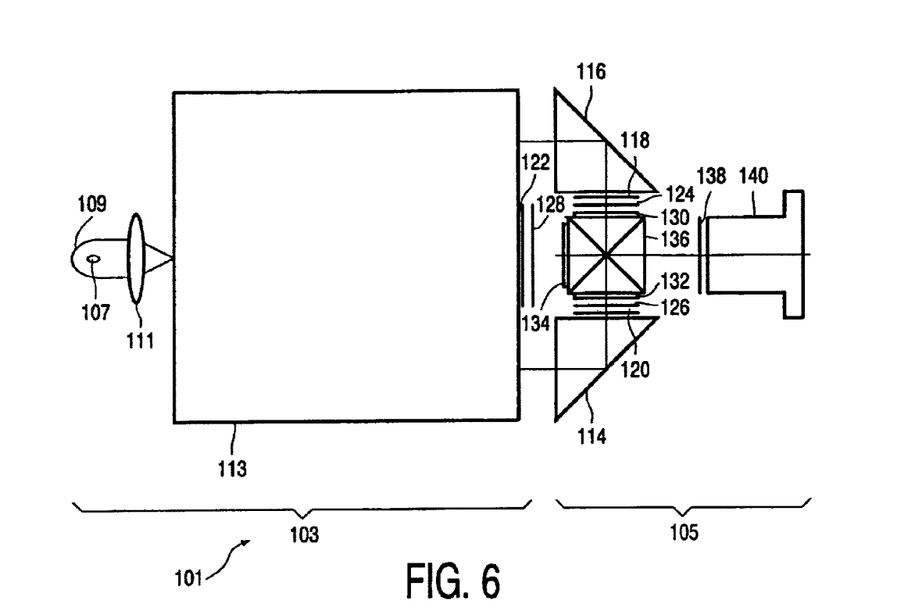
FIG. 6 shows an example of a second projection display device having three transmissive display panels and a light-recycling system.

FIG. 6 shows an example of a second projection display device having three transmissive display panels and a light-recycling system. The second image projection system 101 comprises an illumination system 103 for supplying three illumination beams having a red, a green and a blue color, respectively, and an image display system 105 for modulating the three illumination beams and for projecting an image on a screen (not shown). The illumination system 103 comprises a light source 107, a reflector 109, a condenser lens 111 and a light-guiding means 113, for example, a rod of optically transparent material. The three illumination beams generated by the illumination system 103 are incident on the image display system 105. The image display system 105 comprises three transmissive display panels 130,132, 134, a dichroic cross 136, an analyzer 138 and a projection lens 140.

The reflector 109 ensures that the greater part of the light emitted by the light source 107 in a direction away from the system as yet reaches the system. The optically transparent rod 113 is provided with an entrance surface and an exit surface. The exit surface is provided with a reflective layer except for three exit apertures. Furthermore, the projection display device 101 further comprises further light-guiding means, for example, folding prisms 114,116 to guide two illumination beams from the optically transparent rod 113 to the transmissive display panels 130,132. The two folding prisms 114,116 are positioned between the exit surface of the optically transparent rod 113 and the transmissive display panels 130,132, a first folding 114 prism being placed at a first aperture at one end of the exit surface of the optically transparent rod 113 so that an illumination beam is directed to one of the transmissive display panels 130,132 forming the blue light channel, and the second folding prism 116 being placed at a second aperture at the other end of the exit surface of the optically transparent rod 113 forming the red channel. The surfaces of the folding prisms 114,116 facing the transmissive display panels 130,132 are provided with a red and a blue dichroic filter 118,120, respectively. Furthermore, reflective polarizers 124,126 are provided between the dichroic filters 118,120 and the transmissive display panels 130,132. The reflective polarizers 124,126 transmit a portion of the illumination beam having a desired direction of polarization.

Furthermore, the optically transparent rod 113 is provided with a third exit aperture at the exit surface for providing a green illumination beam. This exit aperture is provided with a green dichroic filter 122 for transmitting a desired portion of the illumination beam having a green color and reflecting undesired portions of the illumination beam having a blue and a red color back towards the optically transparent rod 113. Furthermore, a reflective polariser 128 is present between the green dichroic filter 122 and the transmissive display panel 134 for transmitting a portion of the illumination beam having the desired direction of polarization. The reflective polarizers 124,126 and 128 may be of a similar type as used in the first projection display device.

In operation, light from the light source 107 and the reflector 109 is coupled into the optically transparent rod 113 via a lens 111 and an entrance surface and coupled out of the optically transparent rod via the three exit apertures in the exit surface. A front view of the entrance surface of the optically transparent rod is shown in FIG. 2. The entrance surface of the optically transparent rod 113 is covered with a reflective layer 39 except for a central aperture 41 at the longitudinal axis of the optically transparent rod 113. A front view of the alternative entrance surface of the optically transparent rod 113 is given in FIG. 3. Instead of one central aperture 39 in the reflective layer, the reflective layer can be divided into a first annular portion 43 centered around a center of the entrance surface through the longitudinal axis and a second portion 45 covering the remainder of the entrance surface. The second portion of the reflective layer is separated from the first portion by an uncovered portion 47 forming an aperture in the entrance surface for coupling in the radiation from the light source 107 and the reflector 109. For both types of entrance surfaces, the ratio between the area of the aperture in the reflective layer and the area of the reflective layer is preferably larger than 5:1. This ratio depends, for example, on the arc length of an incandescent light source and can be found experimentally by a skilled person by optimizing the light output of the projection device 301.

At the exit surface of the folding prisms 114,116, the respective dichroic filters 118,120 transmit a desired portion of the illumination beams having a red and blue color towards the transmissive display panels 130, 132 and reflects the undesired portion of the illumination beams back to the optically transparent rod 113.

Furthermore, the green dichroic filter 122 transmits a desired portion of the illumination beam having a green color and reflects undesired portions of the illumination beam having a blue and a red color back towards the optically transparent rod 113. The reflective polarizer 128 transmits a portion of the illumination beam having the desired direction of polarization and reflects a portion of the illumination beam not having the desired direction of polarization back to the optically transparent rod 113. The transmissive display panels 130,132,134 transmit and rotate the polarization of the respective illumination beams in accordance with the image information. The dichroic cross 136 recombines the beams coming from the transmissive display panels 130,132,134 into a single modulated light beam and directs the combined light beams via an analyzer 138 to the projection lens 140. The projection lens forms an image on a screen (not shown).

In the second projection display device 101, a portion of the illumination beam not having the desired characteristic, i.e. the desired color or desired polarization, is recycled and can be used again for illuminating the transmissive display panels 130, 132, 134. In order to improve the efficiency of the light recycle process, quarter-wave plates (not shown) can be placed between the respective reflective polarizer 124,126, 128 and the dichrioc filters 118,120, 122 for rotating the polarization of the reflected portions of the illumination beams by 90°.

Figure 7:
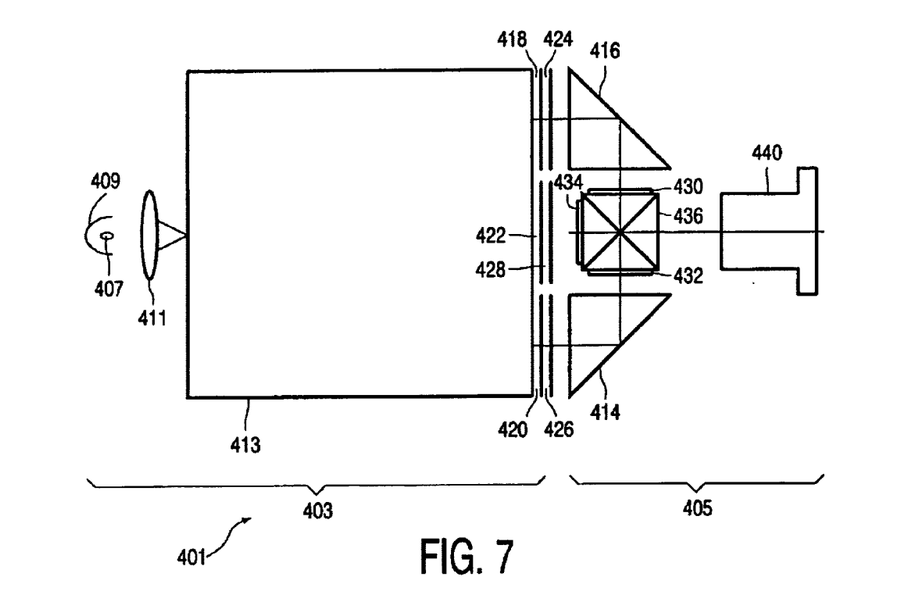
FIG. 7 shows an example of a third projection display device having three transmissive display panels and a light-recycling system.

FIG. 7 shows an example of a third projection display device. The third projection display device 401 has also three transmissive display panels of the same type as used in the second projection display device described with reference to FIG. 6. However, an alternative arrangement of the further light-guiding means, the dichroic filters and the reflective polarisers, is applied. The third image projection system 401 shown in FIG. 7 comprises an illumination system 403 for supplying three illumination beams having a red, a green and a blue color, respectively, and an image display system 405 for modulating the three illumination beams, and for projecting an image on a screen (not shown). The illumination system 403 comprises a light source 407, a reflector 409, a condenser lens 411 and a light-guiding means 413, for example, a rod of optically transparent material. The reflector 409 at least partly surrounds the light source 407 and ensures that the greater part of the light emitted by the light source in a direction away from the image display system 405 as yet reaches the system. The optically transparent rod 413 is provided with an entrance surface and an exit surface. The exit surface is provided with three apertures. Furthermore, the image projection display device 401 comprises the further light-guiding means, for example, folding prisms 414,416 to direct the illumination beams from the optically transparent rod 413 to the transmissive display panels 430,432. The two folding prisms 414,416 are positioned between the exit surface of the optically transparent rod 413 and the transmissive display panels 430,432, a first folding prism 414 being placed at a first aperture at one end of the exit surface of the optically transparent rod 413 so that an illumination beam is directed to one of the transmissive display panels 430,432 forming the blue light channel, and the second folding prism 416 being placed at a second aperture at the other end of the exit surface of the optically transparent rod 413 forming the red channel. The apertures of the exit surface of the optically transparent rod 413 facing the surfaces of the folding prisms 414,416 are provided with a red and a blue dichroic filter 418,420, respectively. Reflective polarizers 424,426 are provided between the dichroic filters 418,420 and the entrance surfaces of the folding prisms 414,416. Furthermore, the optically transparent rod 413 provides a third illumination beam via a third exit aperture at the exit surface for illuminating the third transmissive display panel 434. This exit window is provided with a green dichroic filter 422 for transmitting a desired portion of the illumination beam having a green color and reflecting undesired portions of the illumination beam having a blue and a red color back towards the optically transparent rod 413. Furthermore, a reflective polariser 428 is present between the green dichroic filter 422 and the transmissive display panel 434. The reflective polarisers 424,426,428 are of a similar type as used in the first projection display device. In order to improve the efficiency of the light recycle process, quarter-wave plates (not shown) can be placed between the respective dichroic filters 418,420, 422 and the reflective polarizers 426,428, 430 for rotating the polarisation of the reflected portions of the illumination beams by 90°. The image modulation system 405 comprises three transmissive display panels 430,432,434, a dichroic cross 436, an analyzer 438 and a projection lens 440.

Figure 8:
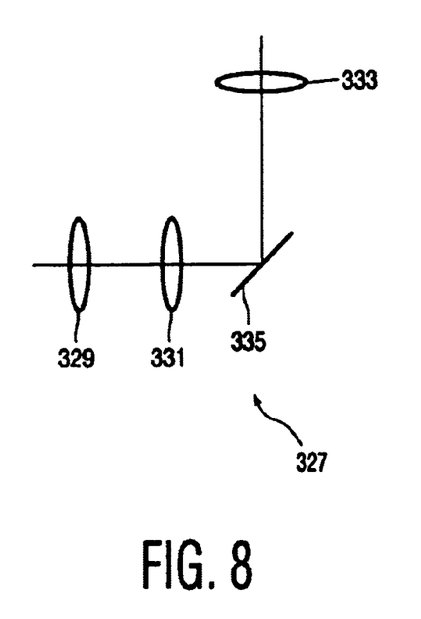
FIG. 8 shows an optical arrangement comprising two lenses and a mirror.

Instead of a folding prism 414,416, an optical arrangement 370 consisting of lenses and a mirror can be applied. FIG. 8 shows the optical arrangement 327 consisting of two relay lenses 329,331, a mirror 335 and a third relay lens 333 which can be applied for guiding the illumination beam from an aperture of the optically transparent rod 413 to the transmissive display panel 432. This arrangement has the advantage that the dimensions of the illumination beam leaving the exit aperture of the optically transparent rod 413 can be matched to the dimensions of the transmissive display panel by adjusting the magnification of this optical arrangement 327.

In operation, the third projection display device 405 operates in an analogous manner as the second projection display device as described with reference to FIG. 6.

The projection display device described above can be easily extended for use with multiple light sources.

Figure 9:
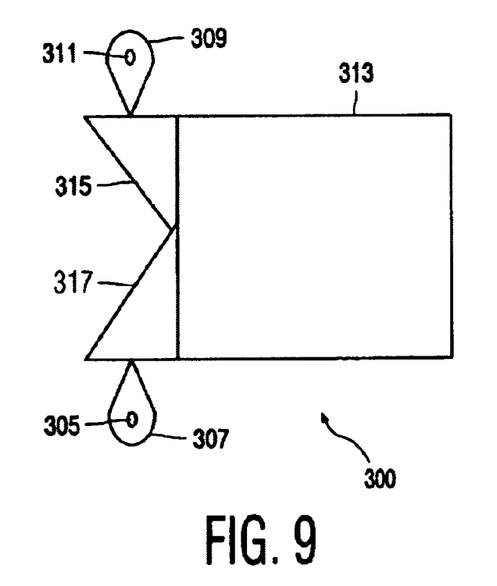
FIG. 9 shows an example of an illumination system using two light sources.
Figure 10:
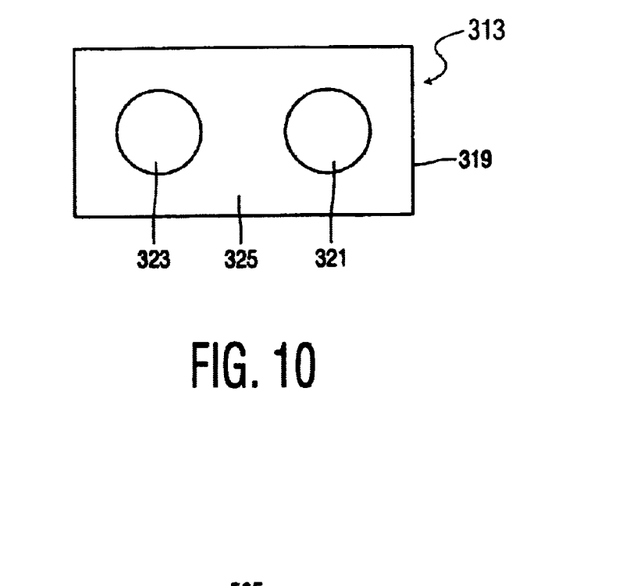
FIG. 10 shows an entrance surface of an optically transparent rod of an illumination system using two light sources.

FIG. 9 shows an arrangement 300 for coupling light into the optically transparent rod 313 from two light sources 307,309. This arrangement can be used in the projection display devices described. The light from the light sources 307,309 is coupled into the optically transparent rod 313 via two prisms 313,315 and the entrance surface 319. FIG. 10 shows an entrance surface of an optically transparent rod 313 for use with two light sources 307,309. The entrance surface 319 is covered with a reflective layer 325 except for two annular apertures 321,323, one aperture for each of the prisms 310,315-. A projection display device provided with this arrangement has the advantage that, by a predetermined throughput of the light path, a higher light output of the projection display device can be obtained. The throughput of the light path is not increased because the shape of the recycling optically transparent rod is not changed. The amount of light that enters the optically transparent rod is doubled, but the recycling mechanism is somewhat lowered because the probability that the reflected light will pass through the apertures 32l,323 of the optically transparent rod 313 is increased. Alternatively, folding mirrors instead of prisms 310,315 may be used.

Instead of a rod of optically transparent material, also a cavity having a reflecting wall can be used, except for openings at the entrance surface and the exit surface. In order to improve the color reproduction of the projected image, the data signals supplied to the display panels can be corrected for a color shift that may occur due to the light-recycling means. Due to the light recycling, each primary color may become dependent on the average color content in the image as can be described by the following multipliers:

$$M_{red} = [N_{red} + (1-N_{red}) \cdot R_{ave}] \tag{2a}$$

$$M_{green} = [N_{green} + (1-N_{green}) \cdot G_{ave}] \tag{2b}$$

$$M_{blue} = [N_{blue} + (1-N_{blue}) \cdot B_{ave}] \tag{2c}$$

wherein $M_{red}$, $M_{green}$, $M_{blue}$ represents the obtained color gain for red, green and blue, respectively, due to the light recycling, $N_{red}$, $N_{green}$, $N_{blue}$ represents the maximum gain obtainable for the respective colors red, green and blue, and $R_{ave}$, $G_{ave}$ $B_{ave}$ represents the average value of a respective red, green and blue content in an image.

Due to the light recycling, the displayed color differs from the expected color on the basis of the image information. For example, the displayed color of an image of a small white box on a colored background will be influenced in dependence upon the color of the background.

The data signals supplied to the display panel can be corrected by multiplying the respective red, green and blue data signals 504 by correction factors $R_{cor}$, $G_{cor}$, $B_{cor}$, which can be determined from the following formulas:

$$R_{cor} = \frac{M_g}{M_r} * \frac{M_b}{M_r} \quad (3a)$$

$$G_{cor} = \frac{M_r}{M_g} * \frac{M_b}{M_g} \quad (3b)$$

$$B_{cor} = \frac{M_r}{M_b} * \frac{M_g}{M_b}. \quad (3c)$$

wherein the maximum value of the correction factors $R_{cor}$, $G_{cor}$, $B_{cor}$ does not exceed one.

Figure 11:
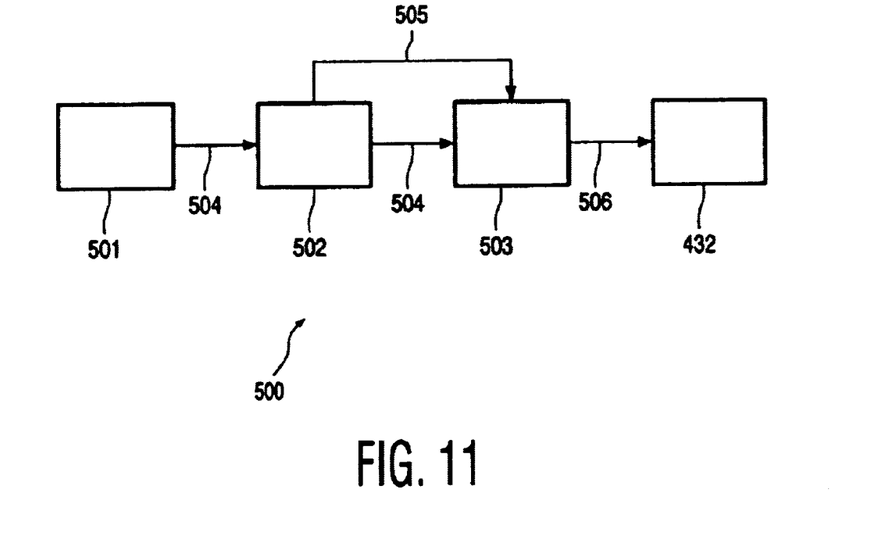
FIG. 11 is a block diagram of a color correction circuit for a projection display device comprising a light-recycling system.

FIG. 11 is a block diagram of a part of the projection display device comprising the processing means 500. The block diagram shows a data source 501, for example, a personal computer, an averaging circuit 502 and a color correction circuit 503. The data source 501 is connected to the averaging circuit 502. The color correction circuit 503 is connected to the data source 501 via the averaging circuit 502. The averaging circuit 502 is arranged to determine the average values of red, green and blue content of the data signals 504. The color correction circuit 503 corrects the red, green and blue data signals 504 in dependence upon the determined average values 505.

After multiplication by the correction factors, the color correction factors, the color correction circuit 503 sends the corrected red, green and blue data signals 506 to the LCOS display panels 432. This color correction in circuit 503 can be used in combination with the projection display devices described hereinbefore.

What is claimed is:

1. A projection display device comprising
   an illumination system having a light source and an optical guiding means having an entrance surface for entering light from the light source and an exit surface for providing an illumination beam,
   an image display system having a display panel for modulating the illumination beam with image information and projecting the image on a screen, and
   means for selectively transmitting a portion of the illumination beam having a desired characteristic to the image display system, and
   means for feeding back an unused portion of the illumination beam to the illumination system for re-illumination of the image display system,
   reflecting means provided at a portion of the entrance surface of the light-guiding means, whereby the unused portion of the illumination beam is fed back into the light-guiding means, characterized in that the reflecting means comprises a reflective layer divided into a first portion and a second portion arranged around the first portion, and separated from the first portion by an uncovered portion of the entrance surface.

2. A projection display device as claimed in claim 1, characterized in that the light-guiding moans comprises a rod of optically transparent material.

3. A projection display device as claimed in claim 1, characterized in that the light-guiding means comprises a cavity provided with reflective walls.

4. A projection display device as claimed in claim 1, characterized in that the unused portion of the illumination beam is fed back into the light-guiding means via its exit surface.

5. A projection display device as claimed in claim 1, characterized in that the reflection means is a reflecting layer provided at the portion of the entrance surface of the light-guiding means.

6. A projection display device as claimed in claim 1, characterized in that the means for selectively transmitting the portion of the illumination beam having a desired characteristic comprises a reflective polarizer.

7. A projection display device as claimed in claim 1, characterized in that the means for selectively transmitting the portion of the illumination beam having the desired characteristic comprises a dichroic color filter.

8. A projection display device as claimed in claim 7, characterized in that the means for selectively transmitting the portion of the illumination beam having the desired characteristic comprises three dichroic color filters for transmitting the red, green and blue portions of the illumination beam, respectively.

9. A projection display device as claimed in claim 8, characterized in that the three dichroic color filters are provided on a wheel which is rotatably mounted at its hub.

10. A projection display device as claimed in claim 9, characterized in that each of the three dichroic color filters occupies adjacent spiral-shaped portions of the wheel such that, in operation, the red, green and blue portions of the illumination beam simultaneously scan portions of the display panel so that all the portions are consecutively illuminated by the red, green and blue portions of the illumination beam, respectively.

11. A projection display device as claimed in claim 10, characterized in that the spiral-shaped portions occupied by the respective dichroic color filters have identical shapes.

12. A projection display device as claimed in claim 1, characterized in that the image display system comprises a reflective or a transmissive display panel.

13. A projection display device as claimed in claim 12, characterized in that the projection display device comprises a further light-guiding means positioned between the exit surface and the display panel for guiding the illumination beam to the display panel.

14. A projection display device as claimed in claim 13, characterized in that the filter means for transmitting a desired portion of the illumination beam are positioned between the exit surface of the light-guiding means and the further light-guiding means.

15. A projection display device as claimed in claim 13, characterized in that the filter means for transmitting a portion of the illumination beam having a desired characteristic are positioned between the further light-guiding means and the image display panel.

16. A projection display device as claimed in claim 13, characterized in that the further light-guiding means comprises a folding prism.

17. A projection display device as claimed in claim 13, characterized in that the further light-guiding means comprises an arrangement of lenses and mirrors.

18. A projection display device as claimed in claim 1, characterized in that the projection display device comprises processing means for correcting colors of the projected image in dependence upon the color content of the image information.

19. A projection display device comprising an illumination system having a light source and an optical guiding means having an entrance surface for entering light from the light source and an exit surface for providing an illumination beam, an image display system having a display panel for modulating the illumination beam with image information and projecting the image on a screen, and means for selectively transmitting a portion of the illumination beam having a desired characteristic to the image display system, and means for feeding back an unused portion of the illumination beam to the illumination system for re-illumination of the image display system, reflecting means provided at a portion of the entrance surface of the light-guiding means, whereby the unused portion of the illumination beam is fed back into the light-guiding means, characterized in that: the image display system comprises a reflective or a transmissive display panel; a further light-guiding means is positioned between the exit surface and the display panel for guiding the illumination beam to the display panel; and the means for selectively transmitting a desired portion of the illumination beam is positioned between the further light-guiding means and the image display panel.

* * * * *